March 13, 1928.

G. L. REGARD

MOTOR CYCLE

Filed March 18, 1926

1,662,718

G. L. Regard
INVENTOR

By Marks & Clerk
ATTYS

Patented Mar. 13, 1928.

1,662,718

UNITED STATES PATENT OFFICE.

GEORGES LOUIS REGARD, OF GENEVA, SWITZERLAND.

MOTOR CYCLE.

Application filed March 18, 1926, Serial No. 95,733, and in Switzerland July 6, 1925.

The type of motor cycle enabling two persons to be carried is a modern requirement and the builders, in order to satisfy this desire, have introduced the side-car. The side-car, however, is cumbersome; it is heavy to pull because it is drawn incorrectly; it hampers steering and the stability of the machine. Motor cyclists have remedied these drawbacks by an infinitely simpler solution by placing upon the luggage carrier a removable seat. Makers of accessories for motor cycles have introduced special seats, but these seats are not comfortable and the passenger, if a lady, must sit side-ways; in case of a fall there is therefore a possibility of the passenger falling on the back of the head.

Now the present invention has for its object to avoid these drawbacks and enable the passenger to be seated comfortably in a normal manner facing the front of the machine.

The object of the present invention is a two seated motor cycle one of the seats of which is supported in the usual way by the frame of the machine whilst the other is mounted above the rear wheel, the rear part of the frame being slightly longer than that of an ordinary motor cycle and the frame between the two seats concaved in the same way as that of a lady's bicycle.

The accompanying drawings show a constructional form of the present invention, in which Fig. 1 is a side elevation of a motor cycle provided with a frame having the preferred form of the invention.

Figure 1:
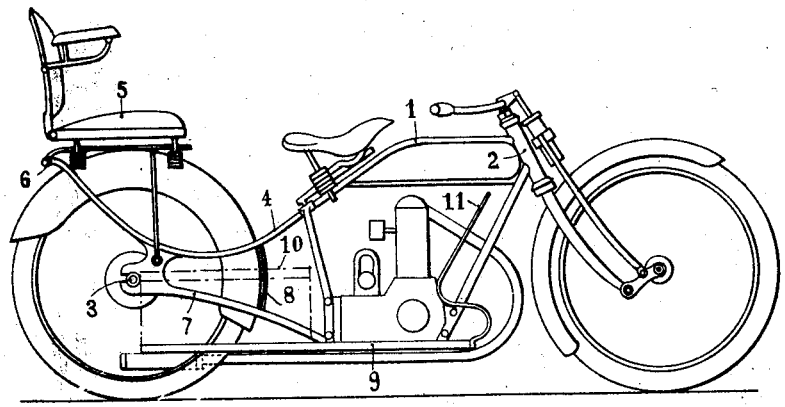
Figure 2:
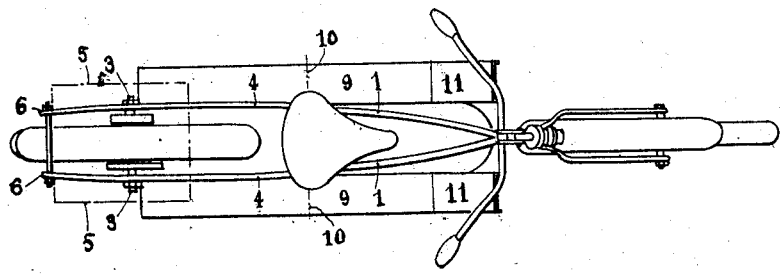
Fig. 2 is a plan view of the frame shown in Fig. 1.
Figure 3:
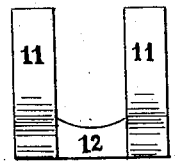
Fig. 3 is a plan view of the mud guard employed in conjunction with the frame.

The motor cycle shown differs from the ordinary type by having a slight elongation of the rear part of its frame and by the special form of this latter which is made in the same way as the frame of a lady's bicycle so as to leave between the two seats a space free for the legs of the passenger and for enabling the driver to pass.

In the present constructional form the upper part of the frame is represented by two upper tubes 1, extending from the tube of the steering column 2 to the axis of the rear wheel 3. These tubes 1 are arched downwardly in their rear part 4, between the saddle for the driver and the rear wheel in such a manner as to provide a passage for the driver whilst the passenger can also take up a position there.

These two tubes extend past the rear of the axis of the rear wheel so as to serve as a point of support for the folding seat 5, which is located above the rear wheel. At their rear end 6 the two tubes 1 are interconnected by a stay in such a manner as to ensure the rigidity of the frame. With a view to avoiding any giving or flexing of the curved portion 4, the stringers 7 connecting the gear case of the motor cycle to the axis of the rear wheel are slightly arched, their convexity being opposed to the convexity of the curved portion 4, and connected to said curved portion by a connecting member 8.

The seat 5 may be replaced by a small bridge, which enables the motor cycle to be used as a motor carrier.

The rests for the feet of the ordinary type are replaced by large plates 9 serving in front as foot rests and to the rear as a support on which any traveling trunks or bags may be placed.

This arrangement greatly facilitates construction and ensures the rigidity of the trunks.

Finally the leg guards 11, are placed parallel to the tube which descends from the steering tube to the gear case, that is to say, contrary to that which is usually done; they are directed from the top downwards and from the front to the rear. These leg guards are made of sheet iron and like actual mud guards have a flange which descends from the side of the wheel. At the bottom they are bent towards the front so as to leave a space free for the foot. Under the fastening bolts which connect the leg guards to the frame and to the foot rest there are leather washers which prevent vibration of the metal plates and thus eliminate any noise.

At the bottom they are connected to each other at 12, either by a plate of sheet iron or by a sheet of leather, so as to ensure a perfect protection of the feet against mud, dust and cold.

Finally the foot support of the machine is placed in front of the rear wheel and extends the whole breadth of the machine in order to assure perfect stability when it rests on this support.

I claim:—

1. A motorcycle frame comprising upper tubes, lower tubes, a bridge connecting said tubes, said upper tubes being arched downwardly adjacent the rear end thereof, said lower tubes extending from the rear end of said frame to a point intermediate the rear and front ends of the frame and being arched upwardly, a seat adjacent the front of said arched portion, and a second seat adjacent the rear of said arched portion.

2. A motor-cycle frame comprising upper tubes, lower tubes, a bridge connecting said tubes, said upper tubes being arched downwardly adjacent the rear end thereof, said lower tubes extending from the rear end of said frame to a point intermediate the rear and front ends of the frame, and foot boards connecting said lower tubes to the front of the frame, a seat adjacent the front of said arched portion, and a second seat adjacent the rear of said arched portion.

3. Frame for motor cycle with two seats comprising upper members extending from the steering head tube beyond the axis of the rear wheel adapted to pass under the saddle for avoiding any pronounced or prominent angle, lower members extending from the steering head tube to the rear wheel and adapted to pass under the motor for avoiding any pronounced or prominent angle, a bridge connecting the two groups of upper and lower members towards the middle of their length and the rear part of the frame being long enough to permit the passage of the legs between the driver's saddle on one side and the passenger's seat and rear wheel on the other side.

4. Frame for motor cycle with two seats comprising upper members extending from the steering head tube beyond the axis of the rear wheel while passing under the driver's saddle and centered towards the top of their rear part, lower members extending from the steering head tube to the rear wheel and adapted to pass under the motor for avoiding any pronounced or prominent angle, a bridge connecting the two groups of upper and lower members towards the middle of their length and the rear part of the frame being long enough to permit the passage of the legs between the driver's saddle on one side and the passenger's seat and rear wheel on the other side.

5. Frame for motor cycle with two seats comprising upper members fixed to the steering head tube, extending past the rear of the axis of the rear wheel and serving as a point of support for the rear seat, a connecting member for connecting these members, lower members extending from the steering head tube to the rear wheel and adapted to pass under the motor for avoiding any pronounced or prominent angle, a bridge connecting the two groups of upper and lower members towards the middle of their length and the rear part of the frame being long enough to permit the passage of the legs between the driver's saddle on one side and the passenger's seat and rear wheel on the other side.

The foregoing specification of my "Improvements in or relating to motor cycles" signed by me this first day of March 1926.

GEORGES LOUIS REGARD.